(12) United States Patent
Sekino

(10) Patent No.: US 8,814,205 B2
(45) Date of Patent: Aug. 26, 2014

(54) PASSENGER AIRBAG DEVICE

(75) Inventor: Tadaaki Sekino, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 13/641,796

(22) PCT Filed: Apr. 27, 2011

(86) PCT No.: PCT/JP2011/060317
§ 371 (c)(1),
(2), (4) Date: Nov. 9, 2012

(87) PCT Pub. No.: WO2011/136297
PCT Pub. Date: Nov. 3, 2011

(65) Prior Publication Data
US 2013/0087997 A1 Apr. 11, 2013

(30) Foreign Application Priority Data
Apr. 28, 2010 (JP) ................. 2010-104153

(51) Int. Cl.
*B60R 21/205* (2011.01)
*B60R 21/231* (2011.01)

(52) U.S. Cl.
USPC ........................................ 280/732

(58) Field of Classification Search
CPC ............. B60R 21/205; B60R 21/231
USPC ................................. 280/729, 732
See application file for complete search history.

(56) References Cited

U.S. PATENT DOCUMENTS

| 5,306,043 | A | * | 4/1994 | Mihm et al. ............... 280/732 |
| 5,584,508 | A | * | 12/1996 | Maruyama et al. ....... 280/743.1 |
| 7,407,185 | B2 | * | 8/2008 | Maripudi et al. ......... 280/743.1 |
| 7,938,445 | B2 | * | 5/2011 | Smith et al. ............... 280/743.2 |
| 8,181,988 | B2 | * | 5/2012 | Adachi et al. ............. 280/729 |
| 8,215,665 | B2 | * | 7/2012 | Ohara et al. .............. 280/729 |
| 8,414,022 | B2 | * | 4/2013 | Song et al. ................ 280/732 |
| 2002/0017774 | A1 | | 2/2002 | Igawa |
| 2003/0034639 | A1 | | 2/2003 | Amamori |
| 2007/0290489 | A1 | * | 12/2007 | Aranzulla et al. ........ 280/732 |

(Continued)

FOREIGN PATENT DOCUMENTS

DE  102007042123 A1  4/2008
EP    1 738 971 A1    1/2007

(Continued)

OTHER PUBLICATIONS

Extended Search Report issued in corresponding European Patent Application No. 117750786 dated Aug. 16, 2013.

*Primary Examiner* — Ruth Ilan
(74) *Attorney, Agent, or Firm* — Sughrue Mion, PLLC

(57) ABSTRACT

The volume of a passenger airbag device is reduced, and the behavior thereof when inflated and deployed is stabilized. A passenger airbag device (1) installed in a top surface of an instrument panel (20) has, on an instrument panel side (back surface side) of an inflated and deployed cushion (10), a projecting portion (10*b*) that serves as support means when an occupant moves forward therein, and recesses (10*c* and 10*d*) provided adjacent to the projecting portion (10*b*). The volume of the cushion (10) is reduced by providing the recesses (10*c* and 10*d*), and the behavior of the airbag device in an inflated and deployed state is stabilized by the projecting portion (10*b*).

4 Claims, 7 Drawing Sheets

(56) References Cited

U.S. PATENT DOCUMENTS

2007/0296186 A1* 12/2007 Kwon ............................ 280/729
2008/0174094 A1    7/2008 Bito
2009/0302587 A1* 12/2009 Thomas ..................... 280/743.2

FOREIGN PATENT DOCUMENTS

| JP | 7-69149 A | | 3/1995 |
| JP | 2000-43663 A | * | 2/2000 |
| JP | 2002-19560 A | | 1/2002 |
| JP | 2002-46562 A | | 2/2002 |
| JP | 2005-329749 A | * | 12/2005 |
| JP | 2007-190991 A | | 8/2007 |
| JP | 2007-196855 A | * | 8/2007 |
| JP | 2008-62728 A | | 3/2008 |
| JP | 2008-114616 A | * | 5/2008 |
| JP | 2008-174216 A | | 7/2008 |
| WO | WO 2008/063103 A | * | 5/2008 |

* cited by examiner

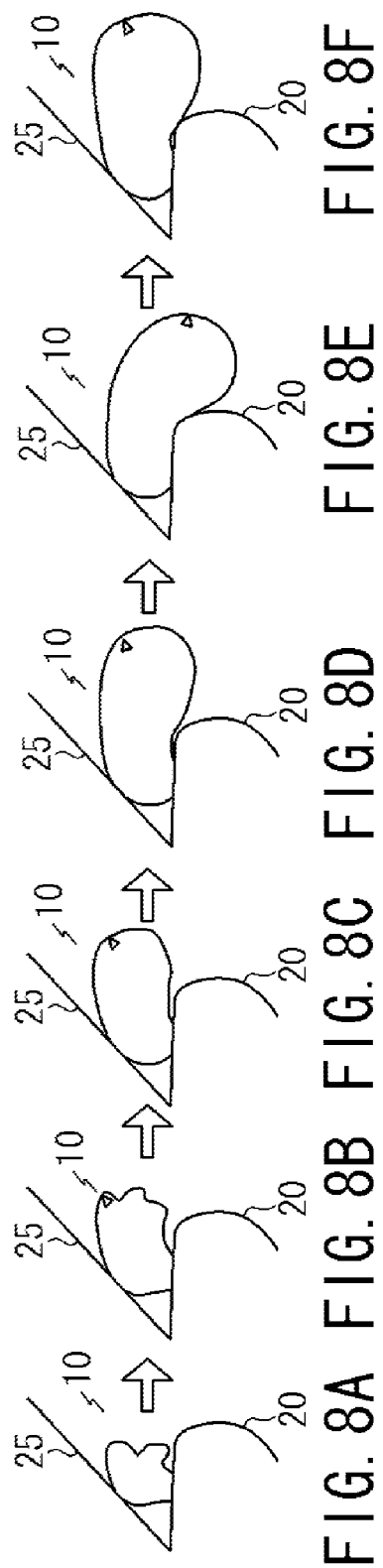

PASSENGER AIRBAG DEVICE

CROSS REFERENCE TO RELATED APPLICATIONS

This application is a National Stage of International Application No. PCT/JP2011/060317 filed Apr. 27, 2011, claiming priority based on Japanese Patent Application No. 2010-104153 filed Apr. 28, 2010, the contents of all of which are incorporated herein by reference in their entirety.

TECHNICAL FIELD

The present invention relates to airbag devices, and more specifically, it relates to passenger airbag devices.

BACKGROUND ART

In general, a passenger airbag device is stored in an instrument panel of a vehicle. When the vehicle stops abruptly due to a collision or the like, the passenger airbag device receives a supply of gas from an inflator attached to the airbag device, is inflated through a deployment door provided in a top surface of the instrument panel, and is deployed in a space between a windshield (front window) and an occupant seated in a passenger's seat, thereby protecting the occupant seated in the passenger's seat.

This passenger airbag device is in contact with the windshield and the top surface of the instrument panel when it is inflated and deployed, whereby the behavior thereof is stabilized. However, if the instrument panel is designed to have a small portion on the occupant side, with respect to an installation position of the airbag device, in the top surface of the instrument panel, the behavior of a cushion (bag) of the airbag device is unstable.

To solve this problem, the volume of the cushion has to be increased to fill a space surrounded by the occupant, the windshield of the vehicle, and the instrument panel, thereby reliably receiving the occupant. Thus, cushions of passenger airbag devices tend to have large volumes.

A cushion of an airbag device having a large volume requires a lager amount of base fabric constituting the cushion. Furthermore, for quick inflation and deployment of the cushion having a large volume, a high-power inflator is needed.

However, because high-power inflators are expensive, the use of such an inflator increases the total cost. In addition, the strength of the airbag device and components thereof also needs to be increased to cope with the power of the inflator, resulting in a problem in that the weight of the airbag device increases.

To overcome this problem, a passenger airbag device, in which the volume of the cushion is reduced so that it can be quickly inflated by a relatively low-power inflator while exhibiting a sufficient impact-absorbing ability, has been proposed (see PTL 1).

FIG. 7 shows an example of such a passenger airbag device.

A cushion 100 of this passenger airbag device includes an occupant-facing surface 102 at its front end, and a windshield-facing surface 104 at an upper surface thereof. The occupant-facing surface 102 and the windshield-facing surface 104 are configured to be connected by an inner member 106. Therefore, when an inflator 112 is activated to discharge gas, the occupant-facing surface 102 is inflated toward the occupant due to the pressure of the gas, and a middle portion of the windshield-facing surface 104 in the top-bottom direction is pulled by the occupant-facing surface 102 through the inner member 106 and is deployed in a shape recessed toward the inner side of the cushion away from the windshield 122. With this configuration, the volume of the cushion 100 is reduced.

Similarly, although it is not necessarily aimed at reducing the volume of the cushion of an airbag device, a passenger airbag device having a cushion composed of a first inflation portion, which constitutes an occupant protection portion that can interfere with an occupant seated in a passenger's seat, and a second inflation portion, which is inflated between the first inflation portion and the instrument panel with the inflation gas flowing from the first inflation portion when the first inflation portion is inflated, is known (see PTL 2).

However, because the cushion 100 of the airbag device disclosed in PTL 1 is reduced in volume on the windshield side, the behavior of the cushion when deployed may be less stable. Furthermore, because a separate member, i.e., the inner member 106, is required and because an operation to attach the inner member 106 to the occupant-facing surface 102 and the windshield-facing surface 104 is required, the fabrication process becomes complex, resulting in another problem in that the cost is increased compared with a cushion formed by simply joining the base fabric pieces.

Furthermore, although the passenger airbag device disclosed in PTL 2 has a more complex structure than that disclosed in PTL 1 and requires high cost, it does not always succeed in reducing the volume of the cushion of the airbag device.

If the overall volume of the cushion is simply reduced, as shown in, for example, FIG. 8, the cushion 10 starts to be inflated and deployed from the top surface of the instrument panel 20, is deployed along the top surface of the instrument panel 20 toward the occupant, without completely filling the space between the instrument panel 20 and the windshield 25 (see FIGS. 8A to 8D). In the subsequent process of being inflated and deployed, the cushion 10 temporarily hangs down in front of the instrument panel 20 (see FIG. 8E) but is then erected away from the panel surface upon further application of the gas pressure from the inflator (see FIG. 8F). Thus, the behavior of the cushion is unstable, and sufficient support may not be provided because the support position of the cushion when the occupant moves forward into the cushion is unstable.

CITATION LIST

Patent Literature

PTL 1: Japanese Unexamined Patent Application Publication No. 2002-19560
PTL 2: Japanese Unexamined Patent Application Publication No. 2005-329749

SUMMARY OF INVENTION

Technical Problem

The present invention has been made in view of the above-described problems occurring with the existing passenger airbag devices, and an object thereof is to provide, at low cost, a passenger airbag device that shows a stable behavior when inflated and deployed and has a sufficient impact-absorbing ability while reducing the volume of the cushion thereof.

Solution to Problem (1) A passenger airbag device of the present invention includes a cushion, and an inflator for supplying gas to the cushion. The passenger airbag device is installed in an instrument panel. The cushion has, on the instrument panel side thereof in an inflated and deployed state, a projecting portion that serves as support means when an occupant moves forward therein.

(2) In the passenger airbag device of the present invention described in the above (1), a recess is provided adjacent to at least one side of the projecting portion.

(3) In the passenger airbag device of the present invention described in the above (1) or (2), the projecting portion extends in a direction of a resultant force of gravity acting on the cushion of the passenger airbag device in an inflated and deployed state and a moving force exerted by the occupant moving forward therein.

(4) In the passenger airbag device of the present invention described in any one of the above (1) to (3), the passenger airbag device includes a main panel having a surface facing the occupant, and left and right side panels joined to side edges of the main panel.

(5) In the passenger airbag device of the present invention described in any one of the above (1) to (4), the passenger airbag device is provided on a top surface of the instrument panel, and a part to fill a space between a windshield and the top surface of the instrument panel when inflated and deployed is formed in a shape corresponding to the space.

(6) In the passenger airbag device of the present invention described in the above (4) or (5), the projecting portion is formed by joining ends of a panel constituting the main panel.

Advantageous Effects of Invention

The present invention provides, at low cost, a passenger airbag device that shows a stable behavior when inflated and deployed and has a sufficient impact-absorbing ability while reducing the volume thereof.

BRIEF DESCRIPTION OF DRAWINGS

FIG. 8 includes schematic views for describing the behavior of a cushion according to Comparative Example in an inflated and deployed state.

DESCRIPTION OF EMBODIMENTS

Embodiments of the present invention will be described with reference to the drawings.

Figure 1:
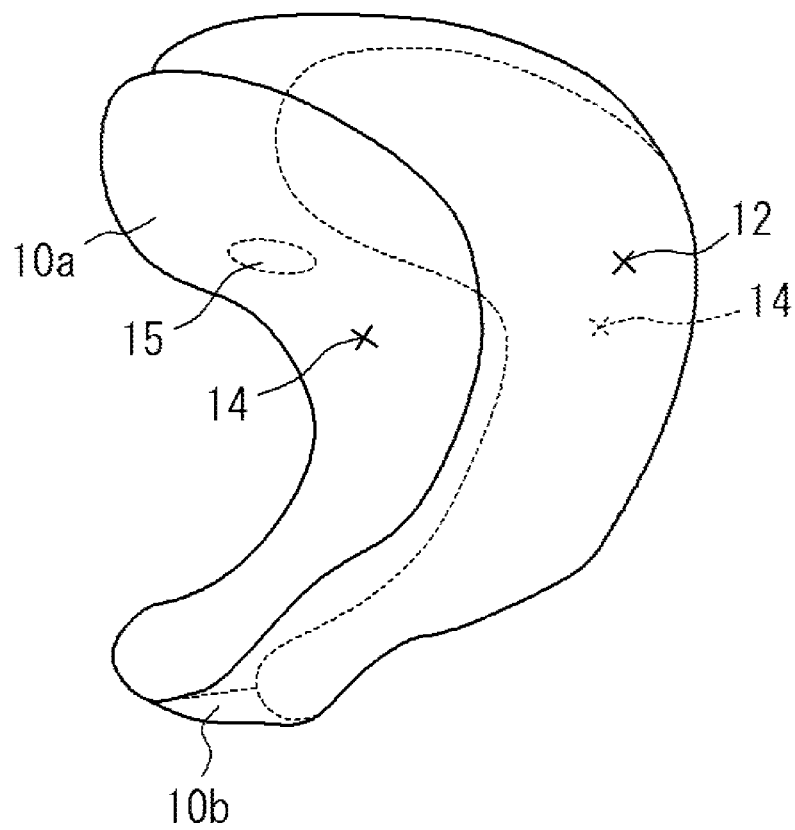
FIG. 1 is a perspective view of a cushion of a passenger airbag device according to a first embodiment of the present invention, in an inflated state.
Figure 2:
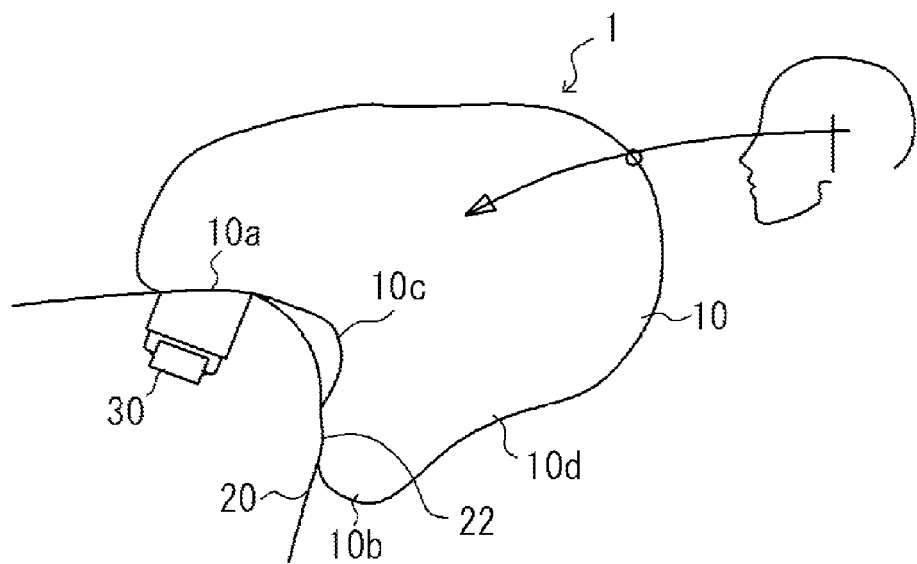
FIG. 2 is a side view of the cushion in an inflated state, showing a state before an occupant moves forward therein.

FIG. 1 is a perspective view of a cushion 10 of a passenger airbag device according to an embodiment of the present invention in an inflated state. FIG. 2 is a side view of the cushion 10 in an inflated state, showing a state before an occupant moves forward therein.

The cushion 10 of the passenger airbag device 1 according to an embodiment of the present invention includes three pieces, i.e., a main panel 12 and side panels 14, and has a configuration in which the side panels 14 are attached to side edges of the main panel 12, forming a single component. The main panel 12 has an opening 15 to which an inflator is attached.

As shown in FIG. 2, the cushion 10 includes, on an instrument panel side as viewed from the occupant side (hereinbelow, simply, "back surface side"), an attaching portion 10a to which an inflator 30 is to be attached; a projecting portion 10b that comes into contact with a side surface of the instrument panel 20; a depressed portion or a recess 10c formed adjacent to the projecting portion 10b and between the attaching portion 10a and the projecting portion 10b; and a recess 10d provided adjacent to and below the projecting portion 10b. The other side of the recess 10d is continuous with the occupant side or the surface side, and the occupant-facing surface constitutes a smooth surface that reduces the impact exerted when the occupant moves forward therein.

The side panels 14 are cut into a shape having portions corresponding to the projecting portion 10b, the recess 10c, and the recess 10d to realize a back surface shape of the cushion 10 of the passenger airbag device 1.

The left and right side panels 14, cut into the above shape, are joined to the side edges of the main panel 12 by, for example, sewing, thereby forming the cushion 10 (means other than sewing, for example, an adhesive, may be employed, as long as the required strength is satisfied).

Herein, the projecting portion 10b of the cushion 10 has an outer shape consisting of an edge having any small curvature. The tip thereof comes into contact with a front surface 22 of the instrument panel 20 when the cushion 10 is inflated and deployed, and the projecting portion 10b constitutes a support portion of the cushion 10 that receives the occupant moving forward therein.

Figure 3:
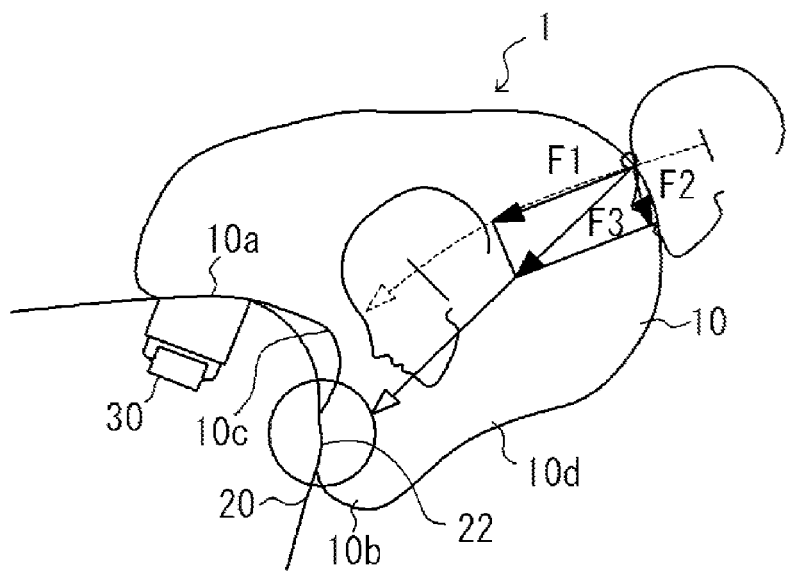
FIG. 3 is a side view showing the occupant moving forward into the cushion in an inflated state.

FIG. 3 is a side view showing the occupant moving forward into the cushion 10. In FIG. 3, forces acting when the occupant moves forward into the cushion are illustrated in a decomposed manner.

As shown in FIG. 3, when the gas from the inflator 30 is supplied to the cushion 10, the cushion 10, as will be shown in FIG. 5 mentioned below, is inflated on the instrument panel 20 by a gas jet and is deployed outward. When the cushion 10 has been deployed outward beyond the top surface of the instrument panel 20, the cushion 10 is then deployed downward under the influence of its own weight, and the projecting portion 10b comes into contact with the front surface 22 of the instrument panel 20.

Once the projecting portion 10b comes into contact with the front surface 22 of the instrument panel 20, the second recess 10d restricts the inflation and deployment of the cushion 10 downward. The projecting portion 10b is kept in contact with the front surface 22 of the instrument panel 20 due to the gas pressure from the inflator. Thus, the position of the cushion 10 in an inflated and deployed state can be stabilized.

Reference signs F1 to F3 in FIG. 3 represent the relationship between forces applied to the cushion 10 when the occupant moves forward into the cushion 10 in an inflated and deployed state, as above.

More specifically, reference sign F1 represents the vector (magnitude and direction) of a force applied to the cushion 10 when an occupant's head moves forward into the cushion 10. Reference sign F2 represents the vector of gravity acting on the cushion 10. Reference numeral F3 represents the vector of a resultant force of the vectors F1 and F2, in other words, the direction and magnitude of the force actually applied to the cushion 10 when the occupant moves forward into the cushion 10 in an inflated and deployed state.

It is preferable that the projecting portion 10b be formed so as to extend in the direction of the vector F3, taking into consideration the vector F3, of this force. By doing so, when the occupant moves forward into the cushion 10, that force is directly transmitted to the front surface 22 of the instrument panel 20 through the projecting portion 10b, and, as a result of that force being balanced with the drag force, the cushion 10 can reduce the impact applied to the occupant due to a collision, in a stable manner (i.e., without moving arbitrarily).

Note that, if the position of the projecting portion 10b is misaligned with the direction of the vector F3, when the occupant moves forward into the cushion 10 of the passenger airbag device 1, a rotation moment due to the vector F3, of the force is generated in the cushion 10, at around a contact point between the projecting portion 10b and the instrument panel 20. Thus, the cushion 10 moves arbitrarily and cannot reduce the impact in a stable state.

Conversely, if the vector F3, of the force acting when the occupant moves forward into the cushion 10 is identified, because portions on the back surface side of the cushion 10 other than a portion subjected to the vector F3, i.e., portions other than the projecting portion 10b, are obviously not involved in the transmission of the force, such portions need not be brought into contact with the instrument panel 20, and consequently, it is understood that the volume of these portions can be reduced.

Hence, in this embodiment, while the projecting portion 10b of the cushion 10 is brought into contact with the front surface 22 of the instrument panel 20, portions other than the projecting portion 10b are cut away so that these portions are recessed inward as much as possible. With this configuration, the behavior of the airbag device in an inflated and deployed state is stabilized, and the volume of the cushion 10 is reduced.

In the passenger airbag device 1 according to this embodiment, by reducing the volume of the cushion 10, the power of the inflator can be reduced relatively, and the size of the side panels 14 constituting the cushion 10 can also be reduced relatively. As a result, the cost can be reduced. Furthermore, because the cushion 10 is reduced in volume on the back surface side and lower surface side thereof, there is no possibility of its behavior, when inflated and deployed, being unstable due to lack of support by the windshield 25.

Although the direction in which the projecting portion 10b of the cushion 10 extends is aligned with the direction of the vector F3 when the occupant moves forward into the cushion 10, the position, in the passenger airbag device 1, at which the occupant actually moves forward therein varies depending on the height and posture of the occupant. Therefore, the direction of the vector F3 needs to have a certain width (tolerance).

The actually required width can be determined based on results of experiments conducted with respect to assumed occupants' heights and postures. In actuality, the width of the projecting portion 10b is obtained by multiplying a value range obtained from the results of experiments by a predetermined factor of safety.

FIGS. 4A to 4F are schematic views for describing the behavior of the cushion 10 of the passenger airbag device 1 according to this embodiment, in an inflated and deployed state.

Figure 4:
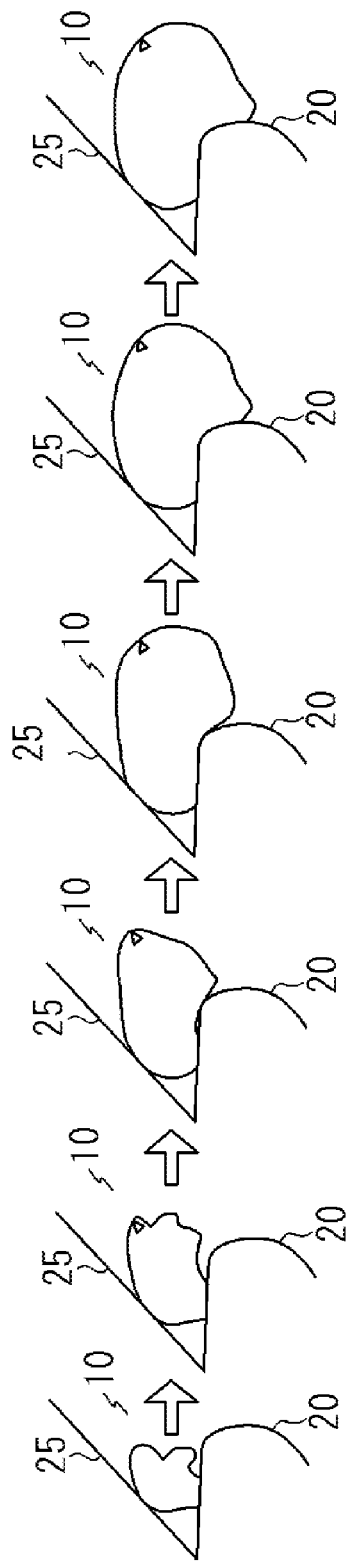
FIG. 4 includes schematic views for describing the behavior of the cushion according to this embodiment, in an inflated and deployed state.

A process is shown in which the cushion 10 starts to be inflated and deployed from a predetermined position of the top surface of the instrument panel 20 and continues to be deployed upward and rightward in the figures while being restricted between the windshield 25 and the top surface of the instrument panel 20 (see FIGS. 4A to 4C). As the lower surface of the cushion 10 extends outward beyond the top surface of the instrument panel 20, the projecting portion 10b moves downward, while making contact with the front surface of the instrument panel 20 (see FIGS. 4D and 4E), and stays at that position (FIG. 4F).

As is clear from the comparison between the cushion 10 according to this embodiment and the airbag device shown in FIG. 8, which is simply reduced in volume without providing the projecting portion 10b, because the cushion 10 according to this embodiment has the projecting portion 10b on the back surface thereof, when it has been deployed outward beyond the instrument panel 20, the projecting portion 10b is then deployed downward and comes into contact with the front surface 22 of the instrument panel 20. Thus, the cushion 10 is not erected away from the instrument panel 20, as shown in FIG. 8.

As has been described above, in the passenger airbag device 1 according to this embodiment, the volume of the cushion 10 is reduced not by using a component other than the base fabric pieces, as required in an existing system, but simply by sewing the side panels 14, which have been cut into a shape having a reduced curvature portion so as to form the projecting portion 10b, to the edge of the main panel 12. Thus, the production cost can be reduced.

Furthermore, because the cushion 10, even without the support by the windshield 25 during inflation and deployment, is deployed outward and then downward when it has extended beyond the top surface of the instrument panel 20 and because the tip of the projecting portion 10b comes into contact with the front surface 22 of the instrument panel 20 at a relatively early stage of the deployment and is maintained in that state, as described above, the behavior thereof in a deployed state can be stabilized.

Next, a passenger airbag device according to a second embodiment of the present invention will be described.

Figure 5:
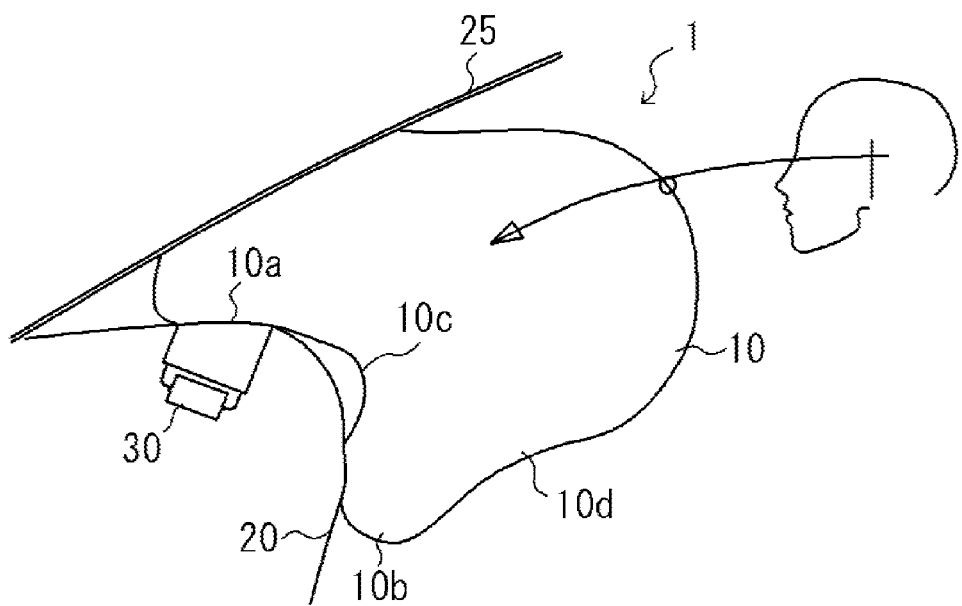
FIG. 5 is a side view of a cushion of a passenger airbag device according to a second embodiment, in an inflated and deployed state.

FIG. 5 is a side view of the cushion 10 of the passenger airbag device 1 according to the second embodiment, in an inflated and deployed state.

The cushion 10 according to this embodiment comes into contact with the windshield 25 as it is inflated and deployed, and the behavior thereof is stabilized by being in contact with the windshield 25 and the top surface of the instrument panel 20. Herein, a portion of the cushion 10, according to this embodiment, to be deployed between the windshield 25 and the top surface of the instrument panel 20 is formed in a shape corresponding to the shape of the space therebetween, and the shape of the other part is the same as that of the passenger airbag device 1 according to the first embodiment.

With this configuration, the volume of the cushion 10 of the passenger airbag device 1 according to the second embodiment can be further reduced, compared with the passenger airbag device 1 according to the first embodiment. More specifically, because the portion of the cushion 10, according to this embodiment, between the windshield 25 and the top surface of the instrument panel 20 is formed in a shape corresponding to the shape of the space therebetween, an excess part that does not fit in the space between these portions does not protrude and swell out toward the occupant side. Thus, not only can the power of the inflator be further reduced, but also can the size of the side panels 14 be further reduced. Accordingly, a further cost reduction is possible.

Next, a process of forming the projecting portion 10b according to the first and second embodiment or a process of forming a small curvature portion so as to conform to the shape of the space between the top surface of the instrument panel 20 and the windshield 25 (herein, the small curvature portion is referred to as an "irregular-shape portion") will be described.

Figure 6:
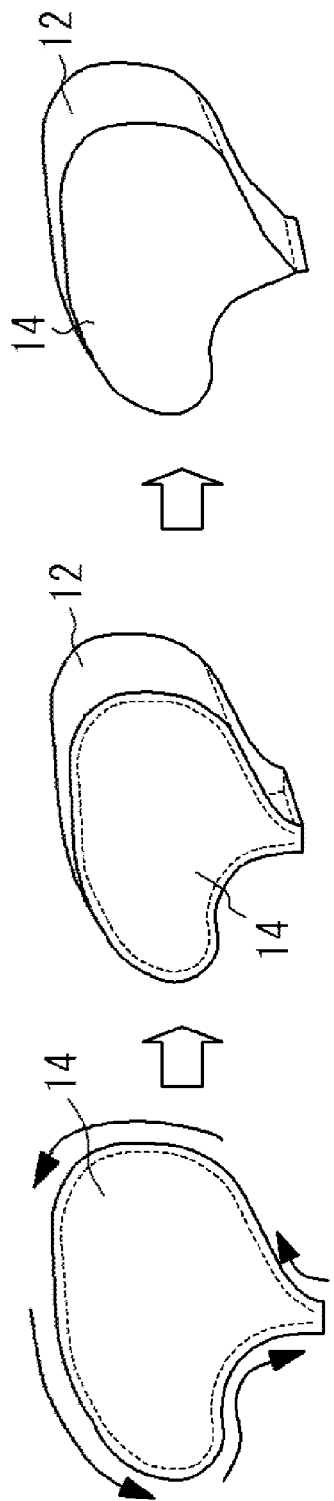
FIG. 6 includes diagrams for describing a process of sewing a small curvature portion.
Figure 7:
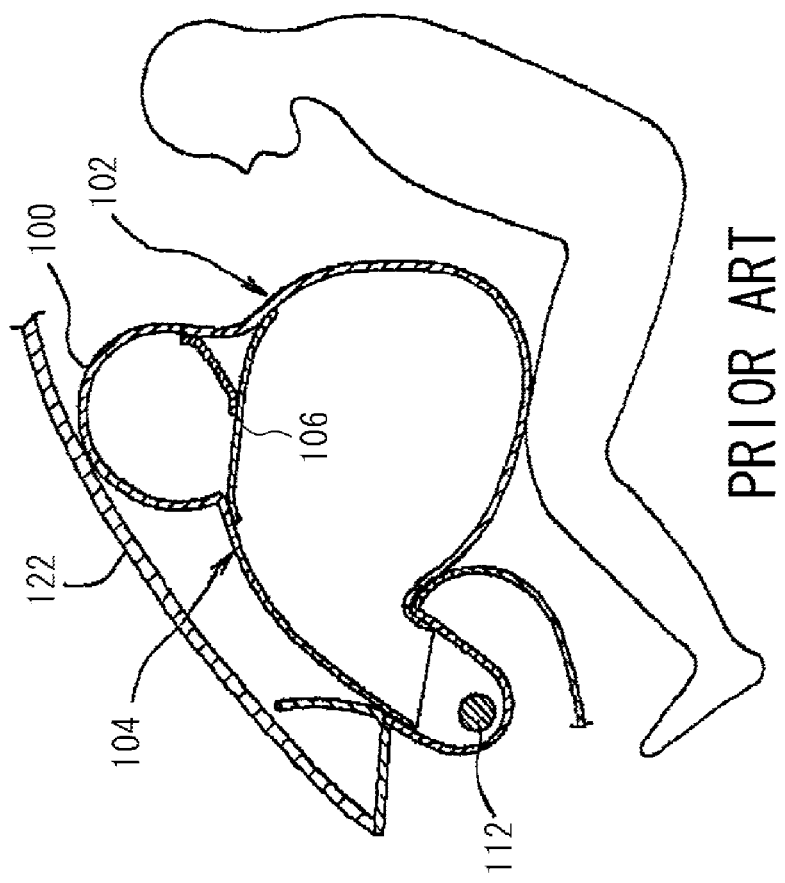
FIG. 7 shows an example of an existing passenger airbag device.

FIG. 6 includes diagrams for describing a process of sewing the irregular-shape portion.

As has already been described, the passenger airbag device according to this embodiment is formed of the main panel 12 and the left and right side panels 14.

Herein, in the case of a normal process of sewing the irregular-shape portion, first, ends of the main panel 12 are sewn together to form a continuous piece, and the left and right side panels 14, which have been cut into a predetermined shape, are sewn to the side surfaces of the formed continuous piece. In this case, if the main panel 12 and the side panels 14 to be sewn together are misaligned relative to each other during sewing, such misalignment cannot be absorbed during sewing. As a result, wrinkles are formed at an end of the seam of the main panel 12 and the side panels 14, and a smooth sewn surface cannot be obtained, and thus, a wavy shape results. If the seam having such a shape is subjected to high-temperature, high-pressure gas from the inflator, gas leakage may occur, or, in an extreme case, the sewing portion may be broken.

However, in actuality, because it is impossible to prevent the misalignment between the main panel 12 and the side panels 14 during sewing, the irregular-shape portion could not be sewn by using the above-described sewing method.

Hence, in the present invention, the above-described process of sewing is changed. The ends of the main panel 12, in the form of a continuous piece, are not sewn together at the beginning, and in this state, the main panel 12 and the side panels 14 are sewn together along their edges (see FIG. 6A). At this time, a stitch-starting end and a stitch-terminating end in the side panels 14 and the main panel 12 are not overlapped.

By doing so, when the side panels 14 have been sewn to the main panel 12, a rectangular hole is left as an unsewn portion between the stitch-starting end and the stitch-terminating end. Then, short sides of this unsewn portion are folded inward in a V shape and closed (see FIG. 6B), and the closed portions are sewn together (see FIG. 6C).

This sewing method enables the irregular-shape portions, such as the projecting portion 10b of the cushion 10 and the portion between the windshield 25 and the top surface of the instrument panel 20, to be formed to have desired shapes, without taking into consideration the curvatures thereof.

Note that the main panel 12 may have a plurality of irregular-shape portions. In such a case, the main panel 12 is formed of a plurality of panels.

Because the passenger airbag device 1 according to this embodiment is provided with the projecting portion 10b in the cushion 10 thereof, the necessity to depend on support by the top surface of the instrument panel 20 and the windshield 25 can be reduced. Accordingly, it is less likely to be affected by the design and the layout of the vehicle, which is advantageous.

Accordingly, it is possible to improve the flexibility in design and product-planning of the passenger airbag device 1, and it is possible to reduce the weight thereof by preventing an increase in size thereof. Furthermore, because the projecting portion 10b of the cushion 10 is provided so as to extend in the direction of the resultant force acting when the occupant has move forward therein, it is possible to minimize the reaction force (drag force) that is exerted from the instrument panel and is essential to stabilize the behavior of the cushion 10, and it is possible to prevent hanging down of the cushion caused by the head moving forward therein, i.e., hanging down of the cushion in a direction of a tangent line of a circle having a radius extending from the attaching portion to a portion with which the head comes into contact, about the attaching portion of the airbag device. Thus, a stable impact-absorbing behavior can be achieved.

REFERENCE SIGNS LIST

1: passenger airbag device,
10: cushion,
10b: projecting portion,
10c and 10d: recess,
12: main panel,
14: side panel,
20: instrument panel, and
25: windshield.

The invention claimed is:

1. A passenger airbag device comprising:
a cushion; and
an inflator for supplying gas to the cushion, the passenger airbag device being installed in an instrument panel,
wherein the cushion includes a main panel having a surface facing an occupant, and left and right side panels joined to side edges of the main panel,
wherein, the cushion has, on the instrument panel side thereof in an inflated and deployed state, a projecting portion that serves as support means when the occupant moves forward therein,
wherein the cushion also comprises in the inflated and deployed state, on the instrument panel side as viewed from an occupant side, an attaching portion to which the inflator is to be attached and the projecting portion that comes into contact with a side surface of the instrument panel,
wherein the cushion in the inflated and deployed state forms a first recess disposed adjacent to the projecting portion and between the attaching portion and the projecting portion, the recess being opened to and opposing the instrument panel, and
wherein the projecting portion is formed by joining ends of a panel constituting the main panel.

2. The passenger airbag device according to claim 1, wherein a second recess is provided adjacent to and above the projecting portion.

3. The passenger airbag device according to claim 1, wherein the projecting portion extends in a direction of a resultant force of gravity acting on the cushion of the passenger airbag device in an inflated and deployed state and a moving force exerted by the occupant moving forward therein.

4. The passenger airbag device according to claim 1, wherein the passenger airbag device is provided on a top surface of the instrument panel, and
wherein a part to fill a space between a windshield and the top surface of the instrument panel when inflated and deployed is formed in a shape corresponding to the space.

* * * * *